United States Patent
Klaren

[11] Patent Number: 6,016,863
[45] Date of Patent: Jan. 25, 2000

[54] APPARATUS FOR CARRYING OUT A PHYSICAL AND/OR CHEMICAL PROCESS, SUCH AS A HEAT EXCHANGER

[75] Inventor: Dick Gerrit Klaren, Hillegom, Netherlands

[73] Assignee: Klarex Beheer B.V., Nijkerk, Netherlands

[21] Appl. No.: 09/038,442

[22] Filed: Mar. 11, 1998

[30] Foreign Application Priority Data

Mar. 12, 1997 [NL] Netherlands ............................ 1005518

[51] Int. Cl.[7] .................................................... F28D 13/00
[52] U.S. Cl. .................... 165/104.16; 165/108; 165/119; 122/4 D; 422/145; 422/147
[58] Field of Search ............................... 165/104.16, 108, 165/119; 422/145, 146, 147; 122/4 D

[56] References Cited

U.S. PATENT DOCUMENTS

| | | |
|---|---|---|
| 4,246,231 | 1/1981 | Figler et al. ............................ 422/147 |
| 4,289,729 | 9/1981 | Myers et al. ......................... 422/147 X |
| 4,292,023 | 9/1981 | De Feo et al. .................. 165/104.16 X |
| 4,378,744 | 4/1983 | DeFeo et al. ................... 165/104.16 X |
| 4,398,594 | 8/1983 | Klaren . |
| 4,426,958 | 1/1984 | Hosek et al. . |
| 4,554,963 | 11/1985 | Goodwin et al. . |
| 4,615,382 | 10/1986 | Klaren . |
| 4,672,918 | 6/1987 | Engstrom et al. ............. 165/104.16 X |
| 4,716,856 | 1/1988 | Beisswenger et al. . |
| 4,781,574 | 11/1988 | Taylor . |
| 4,955,295 | 9/1990 | Abdulally . |
| 5,033,413 | 7/1991 | Zenz et al. . |
| 5,141,708 | 8/1992 | Campbell, Jr. et al. . |
| 5,159,886 | 11/1992 | Schaub et al. . |
| 5,205,350 | 4/1993 | Hirsch et al. . |
| 5,218,932 | 6/1993 | Abdulally . |
| 5,308,585 | 5/1994 | Stroder et al. . |
| 5,314,611 | 5/1994 | Cetinkaya ............................ 422/147 X |
| 5,343,830 | 9/1994 | Alexander et al. ...................... 122/4 D |
| 5,526,775 | 6/1996 | Hyppänen .......................... 122/4 D X |
| 5,585,071 | 12/1996 | Hyppänen ...................... 165/104.16 X |
| 5,601,039 | 2/1997 | Hyppänen .......................... 122/4 D X |
| 5,676,201 | 10/1997 | Klaren . |
| 5,706,884 | 1/1998 | Klaren . |

FOREIGN PATENT DOCUMENTS

| | | |
|---|---|---|
| 65 332 | 11/1982 | European Pat. Off. . |
| 278 262 | 8/1988 | European Pat. Off. . |
| 413 611 | 2/1991 | European Pat. Off. . |
| 1350734 | 12/1963 | France . |
| 21 52 401 | 4/1972 | Germany . |
| 34 32 864 | 3/1986 | Germany . |
| 2 087 534 | 5/1982 | United Kingdom . |
| WO 94/24507 | 10/1994 | WIPO . |

OTHER PUBLICATIONS

Copy of PCT Search Report

*Primary Examiner*—Christopher Atkinson
*Attorney, Agent, or Firm*—Merchant & Gould P.C.

[57] ABSTRACT

Heat exchanger consisting of a reservoir with upwardly directed tubes through which flow a liquid to be heated and fluidized bed particles for internally cleaning the tubes. Connected to the reservoir is an external downcomer (5) for collecting fluidized bed particles coming from the top box of the reservoir and to be transported back to the bottom box (7) of the reservoir. The connecting line (4, 2, 1, 3, 6) between downcomer (5) and bottom box (7) is designed as two sections (2, 3) with an expansion bellows (1) arranged between them. The bottom section (3) is connected via two or more connecting stubs (6A, 6B) with the bottom box (7) for the uniform distribution of the flow of fluidized bed particles.

3 Claims, 5 Drawing Sheets

APPARATUS FOR CARRYING OUT A PHYSICAL AND/OR CHEMICAL PROCESS, SUCH AS A HEAT EXCHANGER

This invention relates to an apparatus for carrying out a physical and/or chemical process, such as a heat exchanger, comprising a reservoir provided with upwardly directed tubes accommodated, at top and bottom ends thereof, in tube plates, the tubes being in open communication with a top box and a bottom box, at least one distribution plate being arranged in the bottom box for supporting a fluidized bed of granular material maintainable in a quasi-stationary, fluidized condition by a medium to be treated or heated which is supplied via the bottom box and which flows through the tubes, the apparatus further comprising means for feeding fluidized bed particles back from the top box, in the form of a downcomer arranged outside the reservoir and connected, at the top end thereof, to the top box by a separating device, the bottom end of the downcomer being communicable, through switching on and off, with the bottom box of the reservoir.

Such an apparatus is known from EP-B-0,694,152 (see FIG. 1) which corresponds with U.S. Pat. No. 5,706,884 to Klaren, hereby incorporated by reference, and generated from WO-94/24507.

With increasing dimensions of the reservoir provided with tubes and of the downcomer arranged outside that reservoir, which parts may well have a length of 10–12 meters and which, furthermore, are subject to greatly varying temperatures, considerable differences in thermal expansion occur, which are difficult to accommodate in the connecting line between the bottom end of the downcomer and the bottom box of the reservoir. Moreover, with increasing dimensions, the flow of the fluidized bed particles increases, so that the diameter of the connecting line must necessarily be chosen to be greater. This renders the shut-off valve to be placed in the connecting line very costly. With a high flow of fluidized bed particles, it is impossible via a single connecting line to obtain a uniformly distributed supply of those particles to the bottom box of the reservoir, which may result in a non-uniform distribution of the fluidized bed particles over the tubes in the reservoir.

The object of the invention is to provide an apparatus of the above-described type, in which these drawbacks are obviated.

To that end, the apparatus according to the invention is characterized in that the connecting line between the bottom end of the downcomer and the bottom box of the reservoir provided with tubes consists substantially of at least two independent vertically aligned line sections between which an expansion bellows is arranged, while the top line section is closably connected to the downcomer.

What is avoided with an expansion bellows arranged in the above-indicated manner, is that the space between the corrugations is filled with fluidized bed particles, as a result of which the expansion bellows would lose its flexibility. Closing the connecting line between the downcomer and the reservoir can occur by means of a simple closing mechanism, or through an appropriate dimensioning of that connecting line.

For the uniform distribution of the flow of fluidized bed particles to the bottom box of the reservoir, preferably two or more connecting stubs are connected to the bottom line section, while for each connecting stub an associated deflecting plate is present.

Further elaborated embodiments of the apparatus according to the invention are described in more detail in the subclaims.

Exemplary embodiments of the apparatus according to the invention are further elucidated with reference to the drawings, wherein.

Figure 1:
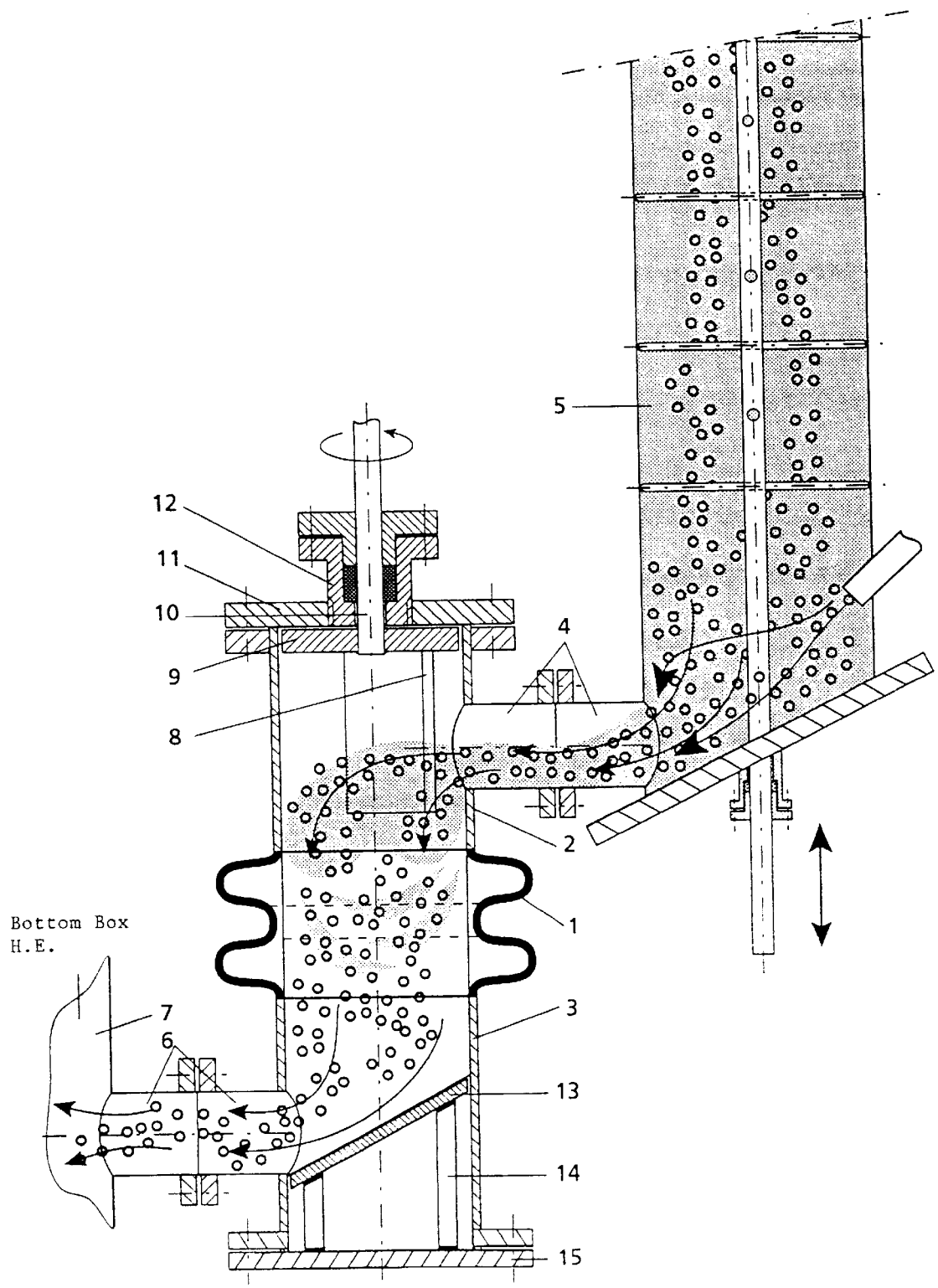
FIG. 1 shows a first embodiment of the connecting line between the end of the downcomer and the bottom box of a heat exchanger reservoir in a plant according to EP-B-0, 694,152.

The difference in thermal expansion between the downcomer 5 and the heat exchanger 50 (see FIG. 5) consisting of a body with a bottom and a top box is accommodated by a vertically arranged expansion bellows 1 between the short line sections 2 and 3. Owing to the vertical position of the expansion bellows 1 the spaces between the corrugations will not readily fill up with fluidized bed particles. The top line section 2 is connected with the downcomer 5 by a connection 4. The bottom line section 3 is connected with the bottom box of the heat exchanger by a connection 6. By virtue of the flexibility of the bellows, there is also provided a method of taking up any dimensional inaccuracies in the vertical distance between the connections 4 and 6 by slightly compressing, or extending, the bellows 1 when mounting the line sections 2, 3. The connections 4 and 6 need not extend exclusively horizontally. Sometimes it is recommendable to have one or both connections 4, 6 slant at an oblique downward angle, so that the transport of the fluidized bed material from the downcomer 5 to the bottom box 7 proceeds more smoothly and is thereby facilitated.

In the top line section 2 a simple mechanism 8–12 is mounted, also suitable for large passages, so that the transport of fluidized bed particles from the downcomer 5 to the bottom box can be regulated or prevented. This closing mechanism 8–12 consists of a metal plate 8 which is so shaped as to fit in the rounding of the inner diameter of line section 2. This plate 8 is mounted on a disc or cross connection 9 which in turn is fixedly connected with a vertical shaft 10 which projects outwardly through a closing flange 11 and packing sleeve 12. What can be achieved by appropriately choosing the dimensions of the curved plate 8 is that upon rotation of the shaft 10 the plate 8 closes off completely or partly the opening of connection 4 to line section 2, so that the supply of fluidized bed particles from the downcomer 5 to the bottom box 7 can be regulated or be shut off. If the connection 4 is properly dimensioned, extends obliquely upwards, or is vertically connected with the line section 2 via a swan-neck construction and no flowing medium flows through the connection 4 to the line section 2, the transport of fluidized bed particles from the downcomer 5 to the bottom box 7 can be blocked, without this requiring a separate closing mechanism.

Experiments have shown that upon discontinuation of the supply of flowing medium to the medium line extending obliquely into the bottom end of the downcomer 5, no fluidized bed particles flow from the downcomer 5 to the line section 2 if the length L of the horizontal connection 4 is greater than 1.8×the internal diameter D of that connection.

The bottom line section 3 can be closed off by a plate 13. Through an inclined arrangement of this plate 13 a smooth transport of medium and fluidized bed particles to the bottom box can be realized. Plate 13 is mounted on the flange 15 with supports 14 and can be simply replaced in case of wear due to the fluidized bed particles. In the case where not much wear is to be expected, the bottom line section 3 can also be closed off by a plate 13 which is fixedly connected with the bottom end of line section 3. Optionally, in the case of minor wear, line section 3 can also merge smoothly into the connecting line 6 via a bend piece.

Figure 2:
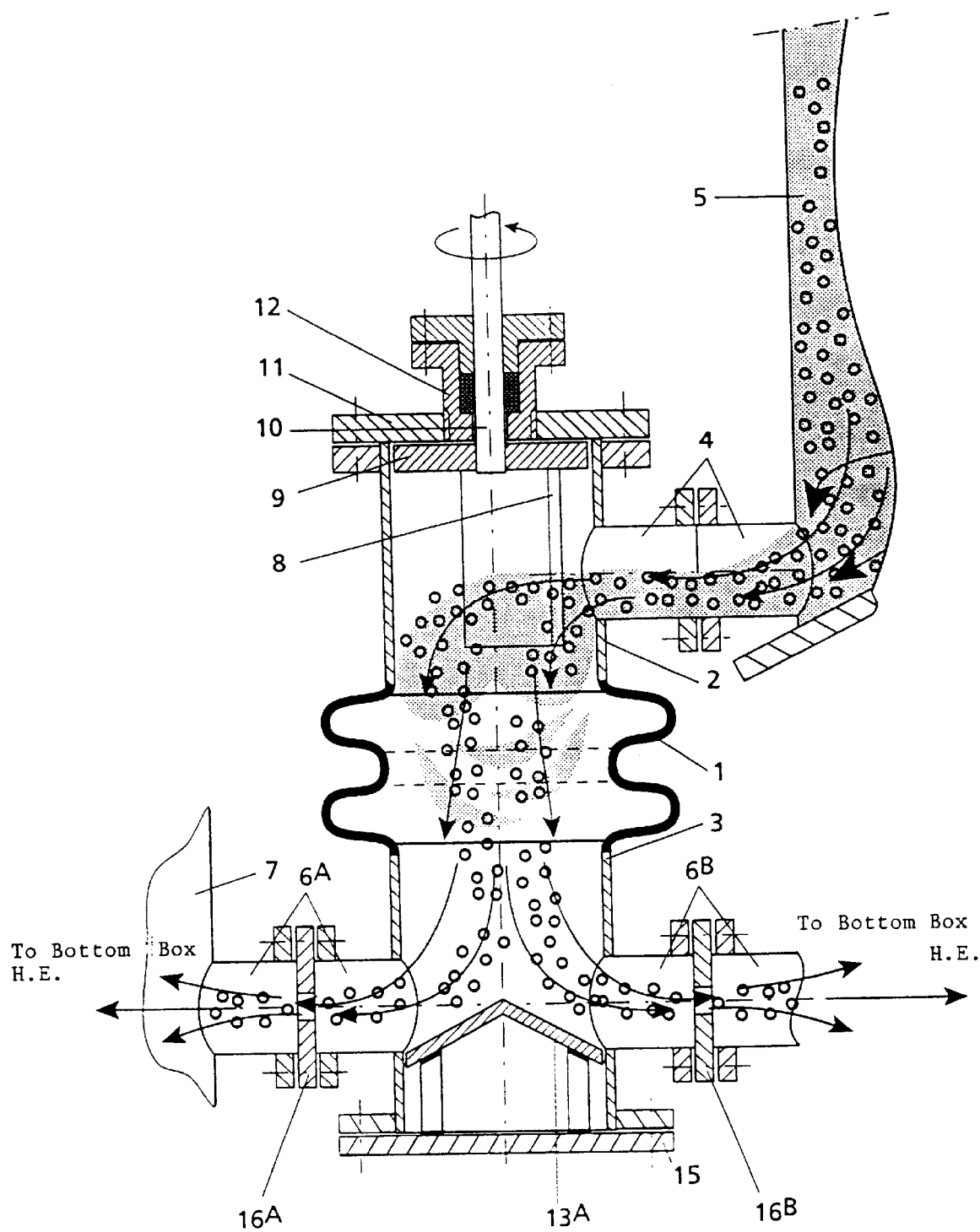
FIG. 2 shows a variant of the apparatus according to FIG. 1, with a divided supply to the heat exchanger reservoir.

In FIG. 2 it is indicated in what way the transport of fluidized bed particles and medium is divided into two equal streams to thereby accomplish a better distributed feed to the bottom box 7 and subsequently to realize a more uniform distribution of medium and fluidized bed particles over all heat exchanger tubes. For this purpose, the bottom line section 3 is split up into two lines 6A and 6B, which are connected to the bottom box. In both lines, basically identical throttling plates 16A and 16B are arranged. If these throttling plates are properly designed, as a consequence of the occurring pressure difference across the throttling plate, the flow of both fluidized bed particles and medium will divide uniformly over the lines 6A, 6B. Again, a smooth transport of medium and fluidized bed particles from line section 3 to the lines 6A and 6B can be realized by means of a removable or fixed plate 13A, or via bends.

Undue and possibly uneven wear of the openings in the throttling plates 16A and 16B, owing to the fluidized bed particles settling to form an undercurrent, can be reduced by arranging the openings eccentrically in the throttling plate and against the underside of the lines 6A, 6B.

Figure 3:
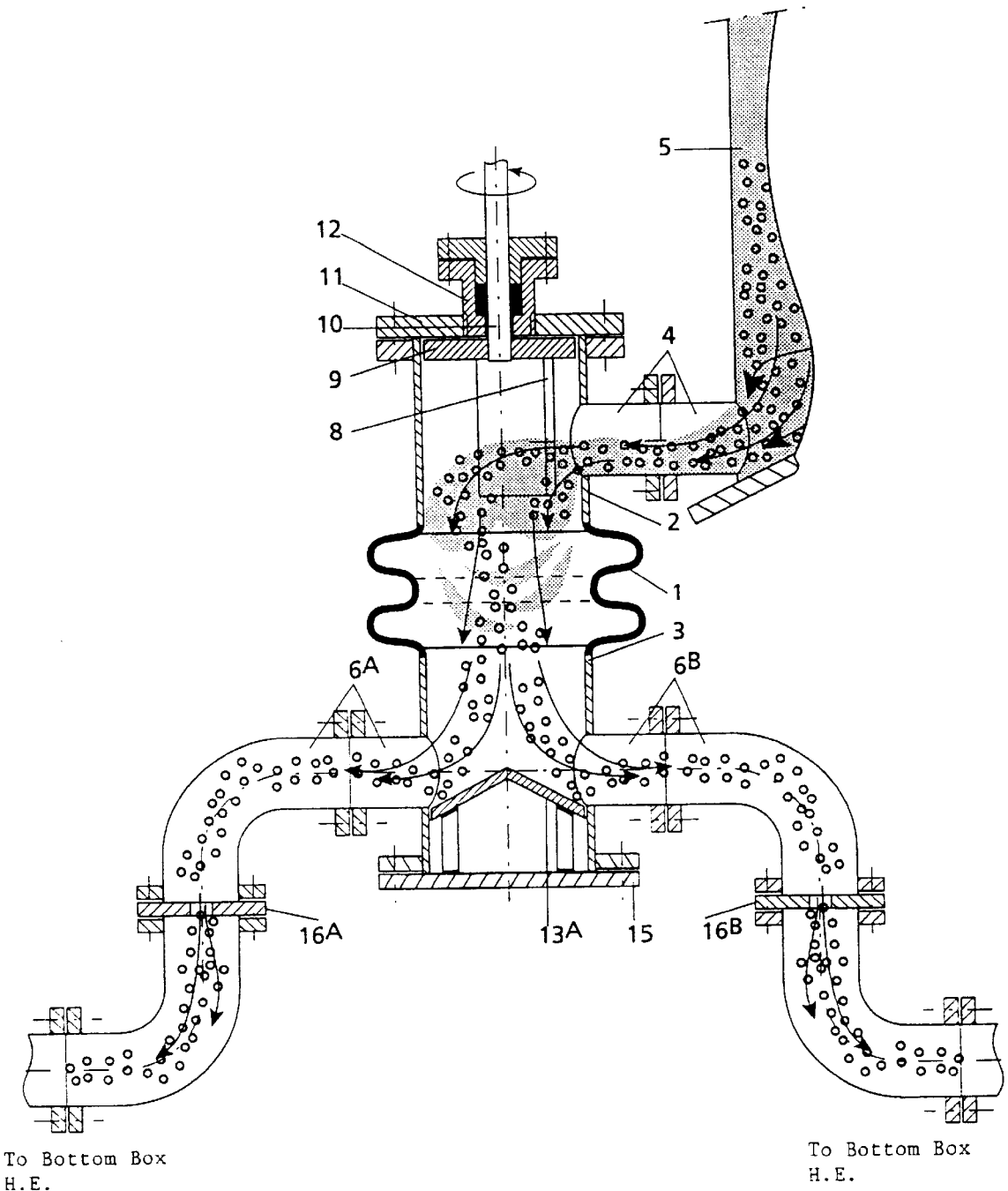
FIG. 3 shows a second variant according to FIG. 2.

A still better solution is to place these throttling plates in a vertical portion of the lines 6A and 6B as indicated in FIG. 3, resulting in a uniform flow approaching the throttling openings.

Figure 4:
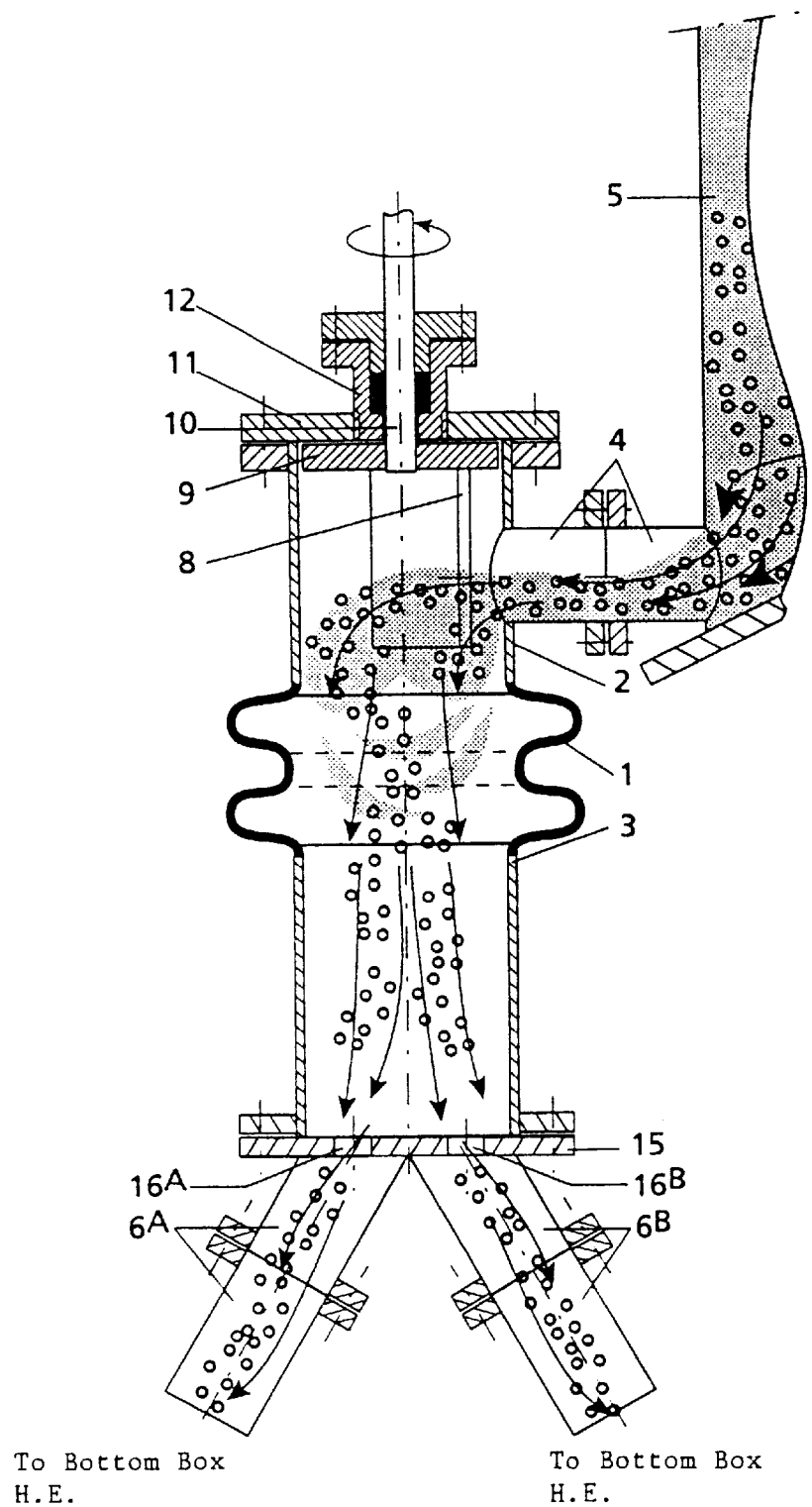
FIG. 4 shows a third variant according to FIG. 2.

A variant of the arrangement of the throttling openings as represented in FIG. 3 is the combination of the closing plate 15 having therein the throttling openings 16A and 16B for the line sections 6A and 6B, as shown in FIG. 4.

Obviously, there are many possibilities of distributing the feed of medium and fluidized bed particles over more than two points of connection to the bottom box, for instance by providing several connections on line section 3, or by further splitting the lines 6A and 6B, as indicated in FIG. 3, it being of importance that the throttling plates are always placed in those lines that are connected directly to the bottom box.

Figure 5:
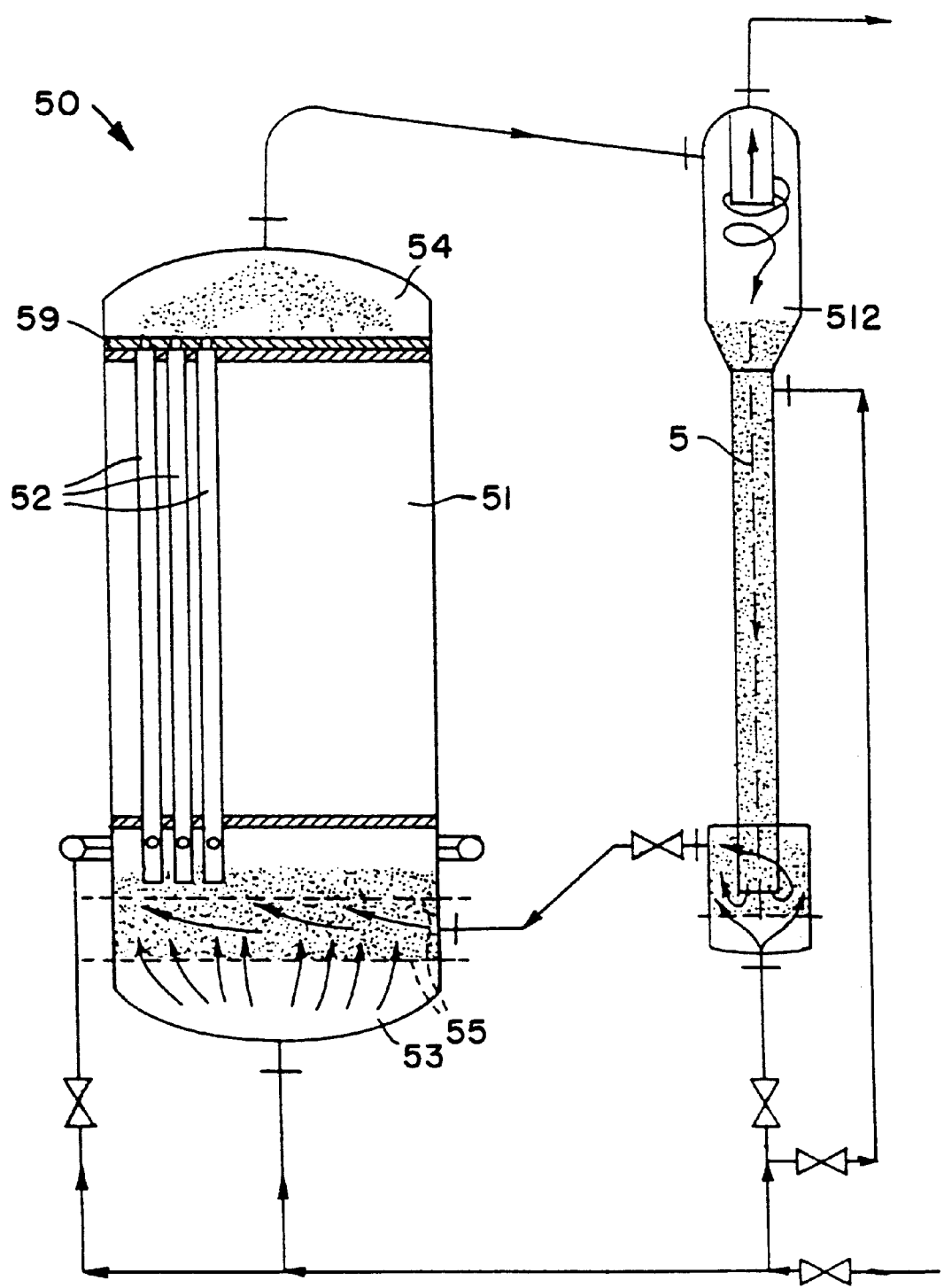
FIG. 5 shows a first embodiment of the apparatus.

FIG. 5 provides an apparatus for carrying out a physical and/or chemical process, such as a heat exchanger 50, including a reservoir 51 provided with upwardly directed tubes 52 accommodated, at top and bottom ends thereof, in tube plates 59. The tubes 52 being in open communication with a top box 54 and a bottom box 53. At least one distribution plate 55 being arranged in the bottom box 53 for supporting a fluidized bed of granular material maintainable in a quasi-stationary, fluidized condition by a medium to be treated or heated which is supplied via the bottom box 53 and which flows through the tubes 52. The apparatus further includes means for feeding fluidized bed particles back from the top box 54, in the form of a downcomer 5 arranged outside the reservoir 51 and connected, at a top end thereof, to the top box 54 by a separating device 512, the bottom end of the downcomer 5 being communicable, through switching on and off, with the bottom box 53 of the reservoir 51.

I claim:

1. An apparatus for carrying out a process, comprising:

a reservoir provided with upwardly directed tubes accommodated, at top and bottom ends thereof, in tube plates, the tubes being in open communication with a top box and a bottom box;

at least one distribution plate being arranged in the bottom box for supporting a fluidized bed of granular material maintainable in a quasi-stationary, fluidized condition by a medium to be treated or heated which is supplied via the bottom box and which flows through the tubes; and means for feeding fluidized bed particles back from the top box, in the form of a downcomer arranged outside the reservoir and connected, at a top end thereof, to the top box by a separating device, the bottom end of the downcomer being communicable, through switching on and off, with the bottom box of the reservoir, wherein the connecting line between the bottom end of the downcomer and the bottom box of the reservoir provided with tubes consists substantially of at least two independent vertically aligned line sections between which an expansion bellows is arranged, while a top line section is closably connected to the downcomer; and wherein in a bottom line section an inclined deflecting plate is arranged for deflecting the flow of fluidized bed particles in the direction of a connecting stub for the bottom box of the reservoir.

2. An apparatus for carrying out a process, comprising:

a reservoir provided with upwardly directed tubes accommodated, at top and bottom ends thereof, in tube plates, the tubes being in open communication with a top box and a bottom box;

at least one distribution plate being arranged in the bottom box for supporting a fluidized bed of granular material maintainable in a quasi-stationary fluidized condition by a medium to be treated or heated which is supplied via the bottom box and which flows through the tubes;

means for feeding fluidized bed particles back from the top box, in the form of a downcomer arranged outside the reservoir and connected, at a top end thereof, to the top box by a separating device, the bottom end of the downcomer being communicable through switching on and off, with the bottom box of the reservoir wherein the connecting line between the bottom end of the downcomer and the bottom box of the reservoir provided with tubes consists substantially of at least two independent vertically aligned line sections between which an expansion bellows is arranged while a top line section is closably connected to the downcomer;

wherein in a bottom line section an inclined deflecting plate is arranged for deflecting the flow of fluidized bed particles in the direction of a connecting stub for the bottom box of the reservoir; and wherein the top line section is provided with a closing mechanism which comprises a bent plate whose radius of curvature corresponds to that of the top line section, said plate being drivable in a direction of rotation for shutting off the flow of fluidized bed particles from the downcomer.

3. An apparatus for carrying out a process, comprising:

a reservoir provided with upwardly directed tubes accommodated, at top and bottom ends thereof, in tube plates, the tubes being in open communication with a top box and a bottom box, at least one distribution plate being arranged in the bottom box for supporting a fluidized bed of granular material maintainable in a quasi-stationary, fluidized condition by a medium to be treated or heated which is supplied via the bottom box and which flows through the tubes;

means for feeding fluidized bed particles back from the top box, in the form of a downcomer arranged outside the reservoir and connected at a top end thereof, to the top box by a separating device, the bottom end of the downcomer being communicable, through switching on and off, with the bottom box of the reservoir wherein the connecting line between the bottom end of the downcomer and the bottom box of the reservoir provided with tubes consists substantially of at least two independent vertically aligned line sections between which an expansion bellows is arranged, while a top line section is closably connected to the downcomer;

wherein in a bottom line section an inclined deflecting plate is arranged for deflecting the flow of fluidized bed particles in the direction of a connecting stub for the bottom box of the reservoir; and wherein a line section is connected with the downcomer by a connection whose length (L) is at least 1.8× the internal diameter (D).

* * * * *